Dec. 26, 1939.   F. W. MEYER   2,184,882
RADIATOR GUARD FOR MOTOR VEHICLES
Filed Dec. 8, 1938
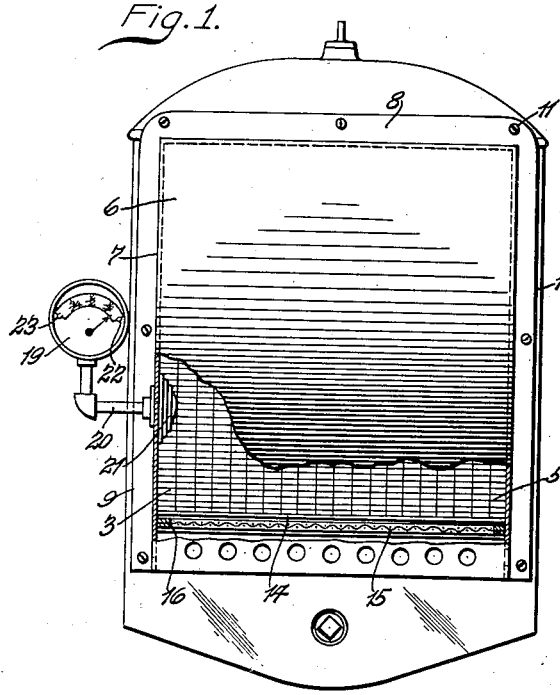
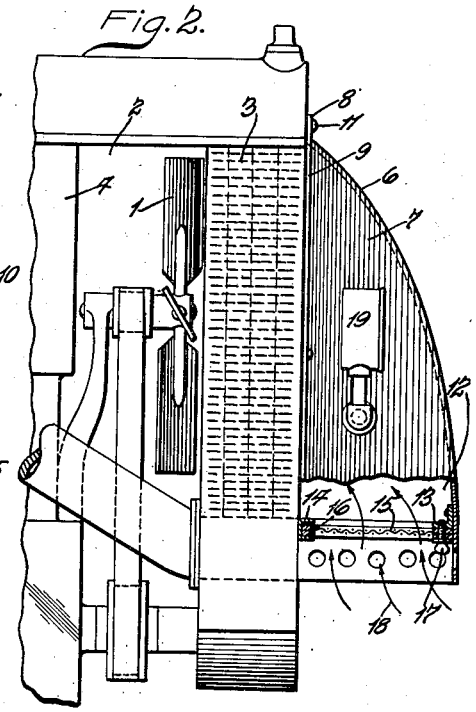
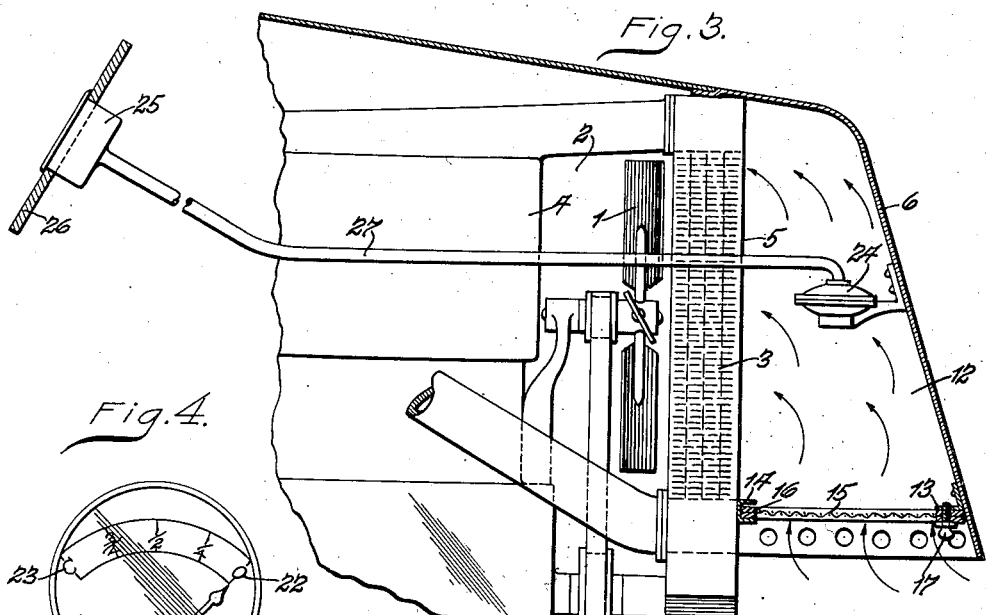
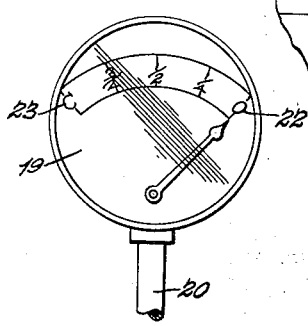
Inventor
Frank W. Meyer
by Rippey & Cassidy
His Attorneys Patented Dec. 26, 1939

2,184,882

UNITED STATES PATENT OFFICE 2,184,882

RADIATOR GUARD FOR MOTOR VEHICLES

Frank W. Meyer, East St. Louis, Ill.

Application December 8, 1938, Serial No. 244,505

4 Claims. (Cl. 293—54)

This invention relates to radiator guards for motor vehicles.

Objects of the invention are to provide a guard and protector for radiators mounted on motor vehicles which will prevent the lodgment against the usual radiator guards or protectors of insects and foreign substances, in order to prevent the same from passing into the space surrounding the motor or engine; to provide a guard for the motor vehicle which includes means for deflecting insects and foreign substances from the radiator and which will, at the same time, admit sufficient air to and through the radiator spaces to prevent overheating; and to provide means in connection with such a device which will indicate to the driver of the motor vehicle the general condition and amount of air passing to and through the radiator.

Other objects will be apparent from the following description, reference being made to the annexed drawing, in which—

Fig. 1 is a front elevation of an embodiment of the present invention with a part of the guard broken away.

Fig. 2 is a side elevation, parts being in section to illustrate the air passage to and through the radiator spaces.

Fig. 3 is a sectional view similar to Fig. 2, showing an alternative or modified form of the invention.

Fig. 4 is an enlarged elevation of a register indicating the condition of the invention.

As is well known, the fan or blower 1 is mounted in a space 2 between the radiator 3 and the usual engine 4 in order to cool the engine and the water circulating through said radiator 3, and about said engine 4.

These motor vehicle radiators usually include a grill 5 located at the front thereof in order to guard, protect or shield the radiator and to receive the impact and prevent contact with the radiator of articles and objects encountered along highways, and also insects.

My present invention comprises a guard adapted to be mounted at the front of a motor vehicle and beyond the usual grill 5 to protect the same and to receive the impact of foreign articles, objects and insects and prevent them from lodging upon the grill 5.

As shown in Figs. 1 and 2, the invention comprises a wall 6 of arcuate form in side elevation and formed in connection with two vertical walls 7. The wall 6 has a flange 8 and the walls 7 have flanges 9 adapted to seat against the frame 10 of a radiator and to be attached thereto by fasteners 11 so as to provide a passage 12 to the radiator open at its lower end and closed at its sides and upper end, as shown.

The open lower end of this passage includes a support 13 fastened to the walls 6 and 7 and a channel bar support 14 attached to the frame 10 of the radiator. A screen 15 is attached within a frame 16 which slips into the channel bar support 14 (Fig. 2), and which may be attached to the support 13 by engageable and releasable clamping fasteners 17. Preferably, this screen is mounted within the passage 12 provided by the walls 6 and 7 and below the lower end of the radiator 5 so that air may enter said passage through the screen 15, as indicated by the arrows 18 in Fig. 2 of the drawing.

A gage device 19 may be mounted upon pipes 20 in connection with diaphragms 21 which are within the space 12 in order to indicate the condition of the device and the condition of circulation of air into and through said space. This includes the condition of the current of air passing in the direction of the arrows 18 through the screen 15, so that, if said screen becomes covered or choked by the lodgment of materials against it, the gage 19 will indicate that fact. This gage may be mounted to face in either forward or rearward directions, or both, as desired.

Upon this gage there may be symbols 22 indicating that the device is working perfectly, and symbols 23, indicating that the device is choked or closed and is not working perfectly.

The alternative or modified form illustrated in Fig. 3 includes the structure of the guard or shield already described, and like reference numerals are applied thereto. The variation in Fig. 3 comprises a diaphragm device 24 mounted in the space 12, and a gage device 25 mounted upon the instrument board or other support 26 in position to be observed by the driver of the vehicle. A tube 27 connects the diaphragm device 24 with the gage device 25 in order to actuate the gage device 25 as the gage device 19 is actuated through the tube 20.

It should now be apparent that this radiator guard effectively protects and shields the usual radiator grill and the radiator from damage by collision with thrown articles and objects, such as pebbles or small stones and the like, and also prevents lodgment upon the radiator grill of insects usually encountered during travel in warm weather. At the same time, the device permits adequate circulation of cooling air through the radiator spaces and about the radiator and the engine and the motor of the vehicle. The invention may be manufactured and applied to standard motor vehicles at comparatively low cost without interfering with the usual functioning of any of the vehicle parts. The invention attains all of its intended objects and purposes efficiently and satisfactorily and may be varied within the scope of equivalent limits without departure from the nature and principle thereof.

I claim:

1. In a motor vehicle having a radiator near its forward end, and a frame surrounding and supporting the radiator; a downwardly and forwardly inclined front wall having its rear end attached to the sides and upper portion of said frame and forming an enclosure in front of the radiator having an open lower end, a screen in the lower portion of said enclosure below the plane of the radiator for screening air passing into said enclosure and thence to the radiator, and supports attached to said frame and to said wall respectively engaging and supporting said screen in an approximately horizontal position in the lower portion of said enclosure below the plane of said radiator as aforesaid.

2. In a motor vehicle having a radiator near its forward end, and a frame surrounding and supporting the radiator; a downwardly and forwardly inclined front wall having its rear end attached to the sides and upper portion of said frame and forming an enclosure in front of the radiator having an open lower end, a support attached to the radiator frame below and in front of the radiator, a screen mounted in said enclosure having its rear portion supported by said support, and means in connection with said wall for supporting and holding said screen from displacement in an approximately horizontal position in said enclosure.

3. In a motor vehicle having a radiator near its forward end, and a frame surrounding and supporting the radiator; a downwardly and forwardly inclined front wall having its rear end attached to the sides and upper portion of said frame and forming an enclosure in front of the radiator having an open lower end, screen in the lower portion of said enclosure below the plane of the radiator for screening air passing into said enclosure and thence to the radiator, supports attached to said frame and to said front wall respectively releasably supporting said screen in an approximately horizontal position in the lower portion of said enclosure, a gage device supported outside of said enclosure, and means in said enclosure between said screen and the radiator responsive to air passing through said enclosure for operating said gage.

4. In a motor vehicle having a radiator near its forward end, and a frame surrounding and supporting the radiator; a downwardly and forwardly inclined front wall having its rear end attached to the sides and upper portion of said frame and forming an enclosure in front of the radiator having an open lower end, a horizontal channel bar support attached to said frame below the radiator, a support attached to the inner side of said wall parallel with said channel bar, a screen frame having its rear portion removably seated within the channel of said channel bar, fasteners releasably attaching the forward portion of said screen frame to said support and cooperating with said channel bar to support said screen frame in an approximately horizontal position forwardly beyond and below the plane of said radiator, and a screen attached to said screen frame for screening air passing therethrough toward said radiator.

FRANK W. MEYER.